(12) United States Patent
Chu

(10) Patent No.: US 7,720,462 B2
(45) Date of Patent: May 18, 2010

(54) NETWORK COMMUNICATIONS SECURITY ENHANCING

(75) Inventor: Steve Chu, San Francisco, CA (US)

(73) Assignee: Cisco Technology, Inc., San Jose, CA (US)

(*) Notice: Subject to any disclaimer, the term of this patent is extended or adjusted under 35 U.S.C. 154(b) by 912 days.

(21) Appl. No.: 11/187,341

(22) Filed: Jul. 21, 2005

(65) Prior Publication Data

US 2007/0021093 A1    Jan. 25, 2007

(51) Int. Cl.
*H04M 1/66* (2006.01)
(52) U.S. Cl. .................. 455/410; 455/411; 455/432
(58) Field of Classification Search ............ 455/525, 455/515, 526, 410, 411, 421, 422.1, 432.1; 370/338, 445, 469, 462, 322, 346, 347, 461; 340/3.51
See application file for complete search history.

(56) References Cited

U.S. PATENT DOCUMENTS

| | | | | |
|---|---|---|---|---|
| 7,200,374 | B1 * | 4/2007 | Stephens ................... 455/254 |
| 7,277,547 | B1 * | 10/2007 | Delker et al. ............... 380/270 |
| 7,295,119 | B2 * | 11/2007 | Rappaport et al. ......... 340/572.4 |
| 2004/0010617 | A1 * | 1/2004 | Akahane et al. ............ 709/243 |
| 2004/0073672 | A1 * | 4/2004 | Fascenda ................... 709/225 |
| 2004/0090929 | A1 * | 5/2004 | Laux et al. ................. 370/311 |
| 2004/0122956 | A1 * | 6/2004 | Myers et al. ............... 709/228 |
| 2004/0229621 | A1 * | 11/2004 | Misra ......................... 455/445 |
| 2005/0020299 | A1 * | 1/2005 | Malone et al. ............. 455/552.1 |
| 2005/0032531 | A1 * | 2/2005 | Gong et al. ................. 455/456.5 |
| 2005/0063331 | A1 * | 3/2005 | Kim et al. .................. 370/328 |
| 2005/0114673 | A1 * | 5/2005 | Raikar et al. ............... 713/182 |
| 2005/0130647 | A1 * | 6/2005 | Matsuda et al. ............ 455/426.2 |
| 2005/0195748 | A1 * | 9/2005 | Sanchez ..................... 370/252 |
| 2005/0220019 | A1 * | 10/2005 | Melpignano ................ 370/232 |
| 2006/0030326 | A1 * | 2/2006 | O'Neill et al. ............. 455/439 |
| 2006/0045033 | A1 * | 3/2006 | Fukuhara .................... 370/310 |
| 2006/0075131 | A1 * | 4/2006 | Douglas et al. ............. 709/230 |
| 2006/0084460 | A1 * | 4/2006 | Matsuo et al. .............. 455/522 |
| 2006/0143292 | A1 * | 6/2006 | Taubenheim et al. ....... 709/225 |
| 2006/0194568 | A1 * | 8/2006 | Sharony ..................... 455/410 |
| 2006/0209700 | A1 * | 9/2006 | Sundar et al. .............. 370/248 |
| 2007/0004444 | A1 * | 1/2007 | Klein et al. ................. 455/522 |
| 2008/0134288 | A1 * | 6/2008 | Halasz et al. ............... 726/2 |
| 2008/0228942 | A1 * | 9/2008 | Lor et al. ................... 709/238 |

* cited by examiner

*Primary Examiner*—Duc Nguyen
*Assistant Examiner*—Dominic E Rego
(74) *Attorney, Agent, or Firm*—Stolowitz Ford Cowger LLP

(57) ABSTRACT

The present invention facilitates security maintenance in a communication network. Present invention embodiments adjust power level and/or communication permission based upon designated parameters. The designated parameters can include time indications, days of the week, failed access attempts, source and destination indications and/or information content indications. For example, a present invention system and method can reduce and/or turn off power to a wireless communication port during designated intervals (e.g., during non standard work hours) and prevent unauthorized access via the wireless communication port.

18 Claims, 3 Drawing Sheets

300

310

Initialize a communication device.

320

Examine communication selectivity parameters.

330

Altering communication permission based upon the selectivity parameters.

FIG 3

NETWORK COMMUNICATIONS SECURITY ENHANCING

FIELD OF THE INVENTION

This invention relates to the field of network communications. In particular, the present invention relates to a source specific multicast layer 2 networking device and method.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reductions in analyzing and communicating data, ideas and trends in most areas of business, science, education and entertainment. These results are often achieved utilizing distributed network resources. However, maintaining security and restricting access to the network infrastructure and/or sensitive information can be complicated and a number of conditions can significantly impact vulnerabilities. For example, some network infrastructure have inherent characteristics or qualities than can be relatively susceptible to security compromises.

Wireless networks are often utilized for communicating information in parts of a communications network and can typically facilitate distributed processing and communication of information over large geographic areas. Wireless networks offer a number of potential advantages including permitting a user to be relatively mobile within coverage areas when engaging in communication activities. Wireless networks usually have a stationary basic infrastructure which communicates information to and from wireless mobile nodes or end user devices such as cell phones, laptops, personal digital assistants (PDAs) and a variety of other devices. A client (e.g., end user) normally accesses a wireless network via a mobile node (MN) by initiating a communication session with an access point (AP), such as a wireless router, switch, etc. The client typically initiates access by engaging in an authentication and registration process with centralized network resources via the access point. Traditionally the authentication and registration process is performed each time a mobile node enters within range or a geographical area associated with an access point. However, roaming between geographical areas usually involves user re-authentication and registration which can adversely impact and/or interrupt the perception of continuous information communication.

Wireless routers and access points are often deployed in a variety of communication networks, including enterprise networks, small business networks, and general household networks. Once a router is up it is generally left to operate indefinitely and many issues can arise when these devices are left on continuously. The nature of constantly transmitting and receiving signals usually beyond the boundaries of a secure geographical location (e.g., beyond the walls of a building) make traditional wireless access points relatively susceptible to infiltration attempts, especially during times when there is typically less administrative oversight (e.g., at night). Wireless devices also transmit radio frequency energy that some have adopted an unfounded concern or perception causes health concerns. Radio interference with other device that share the same radio spectrum can also be prevalent (e.g., baby monitors, alarm systems, cordless phones etc.)

DESCRIPTION OF THE DRAWINGS

FIG. 3 is flow chart of an exemplary communication method in accordance with one embodiment of the present invention.

DETAILED DESCRIPTION

Figure 1:
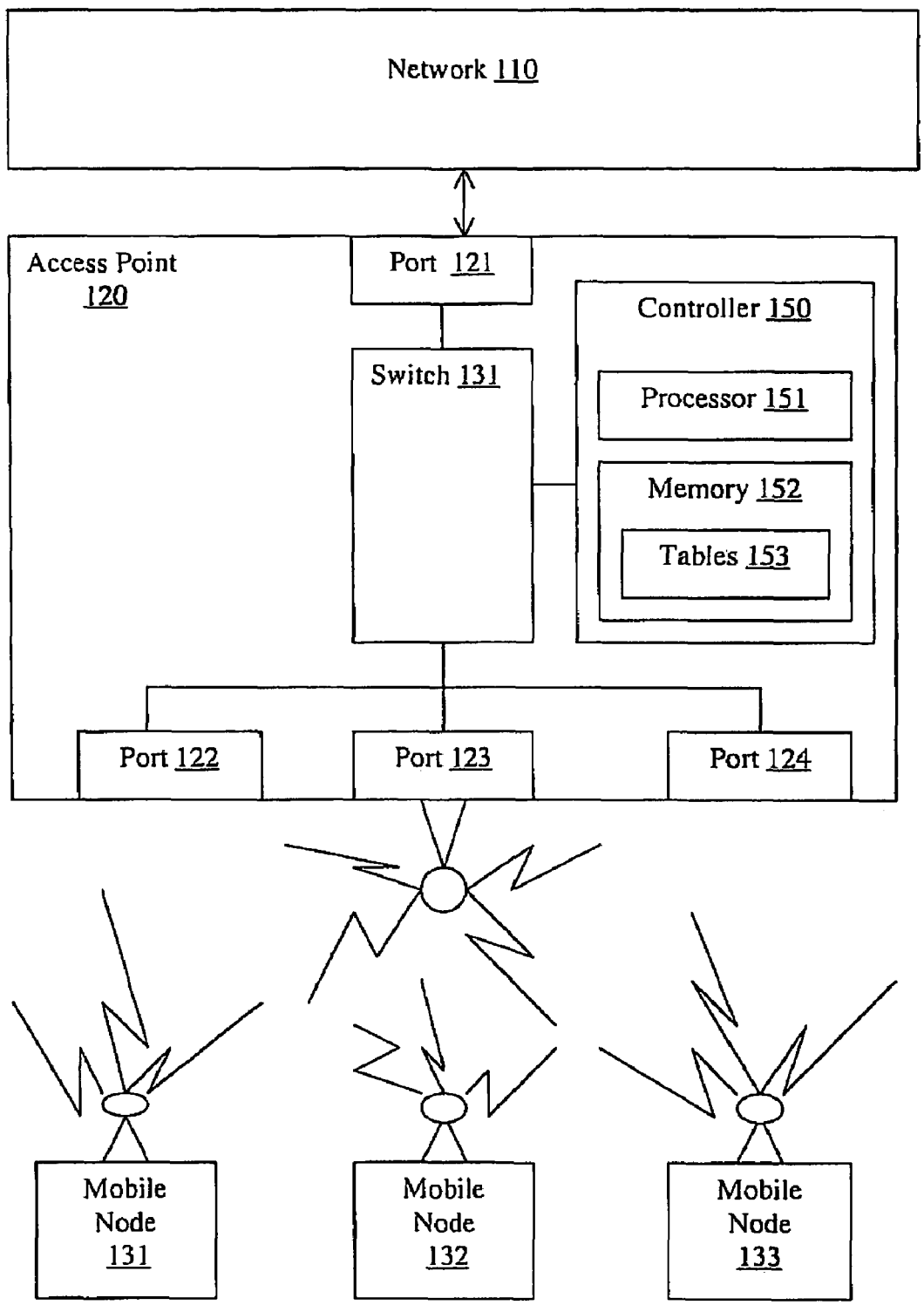
FIG. 1 is a block diagram of communication system including an exemplary communication device in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "setting," "storing," "scanning," "receiving," "sending," "disregarding," "entering," or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention facilitates security maintenance in a communication network. Present invention embodiments adjust power level and/or communication permission based upon designated parameters. The designated parameters can include time indications, days of the week, failed access attempts, source and destination indications and/or information content indications. For example, a present invention system and method can reduce and/or turn off power to a wireless communication port during designated intervals (e.g., during non standard work hours) and prevent unauthorized access via the wireless communication port.

FIG. 1 is a block diagram of communication system 100 including a communication device 120 in accordance with one embodiment of the present invention. In one embodiment, communication device 120 is a communication network access point. For example, communication network users can access the network via communication device 120. Communication system 100 includes network 100, communication device 120 and mobile nodes 131, 132 and 133. Network 100 is communicatively coupled to communication device 120, which in turn is communicatively coupled to mobile nodes 131, 132 and 133.

The components of communication system 100 cooperatively operate to reduce unauthorized access to a communication network while enabling information to be communicated between resources having access to communication network 110. Communication network 110 communicates information to and from components communicatively coupled to communication network 110. Communication device 120 selectively enables mobile nodes 131 through 133 to access communication network 110. Authorized communication of information is forwarded back and forth between communication network 110 and mobile nodes 131 through 133 via communication device 120. Mobile nodes 131 through 133 provide an interface for users to forward and receive information from communication device 120. In one embodiment of the present invention, mobile nodes 131 through 133 wirelessly communicate with communication device 120 (e.g., radio wave communication, microwave communication, infrared communication, laser communication, etc.). In one exemplary implementation, mobile nodes can also be wired to communication device 120 (e.g., through RJ4 connection, universal serial bus interface, cat 5 connection, etc).

Communication device 120 includes switch 131, controller component 150, and ports 121, 122, 123, and 124. Port 121 is coupled to switch 131, which in turn is coupled to ports 122, 123, and 124. Switch 131 is also coupled to controller 150. Port 121 forwards and receives communication packets to and from network 110. Switch 131 selectively forwards the communication packets back and forth to ports 122 through 124, which in turn forward and receive communication packets to and from mobile nodes 131, 132 and 133 respectively. Controller component 150 directs selective communication of information via ports based upon designated parameters.

It is appreciated that there are a variety of parameters that controller component 150 can utilize in the direction of selective communication of the information. Controller component 150 can utilize time as a designated parameter. In one exemplary implementation, controller component 150 can direct adjustment of communication permissions and/or power levels based upon times authorized users are likely to attempt an access a network. For example, controller component 150 can direct power to be reduced (e.g., minimized or turn off) to a wireless communication port from one designated time at which worker are likely to go home (e.g., 7:00 pm) to another designated time at which workers are likely to return (e.g., 8:00). It is appreciated that a time interval within or during a day can occur at any time during the 24 hours of the day (e.g., morning, afternoon, evening and/or night).

Controller component 150 can utilize indication of a day as a designated parameter. For example, controller component can make adjustments based upon the day of the week (e.g., adjustments for Monday through Friday versus Saturday and Sunday) and/or specific dates (e.g., December 25, January 1, July 4, etc.). Controller component 150 can also utilize the number of failed network access attempts as a designated parameter. For example, the controller component 150 can designate a first limit of unacceptable access attempts for one time period (e.g., normal work hours) and a second limit (e.g., smaller) of unacceptable access attempts for another time period (e.g., after normal work hours). Controller component 150 can also utilized source and destination indications and/or information content as designated parameters. For example, the controller component 150 can designate a destination is accessible during one time period (e.g., normal work hours) and not accessible for another time period (e.g., after normal work hours).

It is also appreciated that controller component 150 can utilize a variety of mechanisms to direct selective communication. In one embodiment of the present invention, controller component 150 can direct the power to the plurality of communication ports to be selectively reduced and/or increased based upon designated parameters. For example, power can be reduced and/or increased to a transmitter of a wireless router for a designated or indicated time period (e.g., reduced from 8:00 pm in the evening and increased at 7:00 am in the morning). Turning off power to the wireless transmitter can prevent malicious attempts from accessing the network since no information is communicated via the wireless transmitter. In one embodiment, power can be reduced so it is just strong enough to transmit an effective signal in a smaller defined location (e.g., limit effective transmission to a room within a secured building) or geographic area. This makes the authentication process more secure since the user would have to be able to physically enter the premises in order to establish network connectivity. Reducing the power and/or entering a "sleep mode" permits the access device to remain on without the need for a system restart and can still make it more difficult to access the network through the wireless transmitter because effective communications are limited to a secured location.

In one embodiment of the present invention, initial client authentication permissions are altered for different access points based upon designated parameters. In one exemplary implementation, a first group of access points is enabled to allow session initial client authentication and a second group of access points is disabled from allowing session initial client authentication based upon designated parameters. For example, a client can be permitted to proceed with a session initial authentication protocol with a first group of access points at any time and prevented from attempting a session initial authentication protocol with a second group of access points during designated times (e.g., after normal work hours). The second group of access points can be instructed to permit a session initial authentication protocol at other designated times (e.g., during normal work hours.

In one exemplary implementation, the first group access points can act a master to the second group access points. If a user successfully authenticates with a first group access point initially the user is allowed to roam to second group access point but can not establish a session initial authentication with the second group access points. For example, if a user attempts to authenticate a session initially thru a first group access point (e.g., within an interior office geographical location or perimeter), the authentication process is permitted to proceed but if the user tries to authenticate a session initially thru a second group access point (e.g., an outer office geographical location or perimeter), the authentication process is not permitted to proceed. Once the authentication process has been established, the user is free to roam between groups (e.g., around the premises, into the parking lot, and neighboring buildings). In one embodiment the first group access points can use message forwarding to power up the second group access points. For example, during after work hours a second group access point can be put in a mode that does not actively look for or accept client session initial log on attempts, but if the second group access point receives a message from a first group access point that a client has already accessed the network the second access group access point can continue the session if the client roams into the second group access point area.

Controller component 150 can direct switch 131 to selectively prevent or block communication packets to and/or from ports 121 by preventing information associated with any new session initialization activities from being transmitted. For example, controller component 150 can direct a switch or port to block information associated with session initiation handshake protocols, port identification (e.g., signals intended to notify other devices of the access point existence), communication ping signals, etc. In one embodiment of the present invention, controller component 150 can control switching operations of switch 131 to direct information to ports 121 through 124 respectively based upon information included in communication packets (e.g., source and group destination indications within the communication packets).

It is appreciated that a present invention communication device can be implemented in a variety of systems. For example, the communication device can be a router (e.g., wired and/or wireless router), a bridge, a hub, a switch, an access point, etc.

In one embodiment of the present invention, controller component 150 includes processor 151 and memory 152. Processor 151 is coupled to memory 152. Processor 151 directs access to ports 121 through 124. Processor 151 can direct switch 131 to prevent or permit information communication to and/or from ports 122 through 124. Processor 151 can direct increases and/or decreases in power to ports 123 through 124. In one embodiment of the present invention, processor 151 directs port access and/or control power based upon designated parameters. Processor 151 can also selectively identify which of the plurality of output ports a communication packet is to be communicated on. Memory 152 stores instructions for processor 151 including instructions for directing port access and/or controlling power based upon designated parameters.

In one exemplary implementation, memory 152 includes a table 153 for mapping port access permission and/or power level to designated parameters. Controller component 150 controls information communication and/or power level to ports (e.g., 122, 123 and/or 124) in accordance with table 153 mapping of the ports to designated parameters. Controller component 150 retrieves the designated parameters stored in memory 152 and compares the designated parameters to existing conditions. Based on the comparison, controller component 150 directs implementation of adjustments associated with the designated parameters. For example, if the current time of day corresponds to a designated parameter time of day associated with a reduced power level in the communication ports, controller component 150 directs a reduction in power to the communication ports. In one embodiment, packets are forwarded to and from a port unless controller component 150 directs switch 131 to prevents or blocks packets from being forwarded to and from the port (e.g., a designated parameter indicates information should not be communicated via the port).

Figure 2:
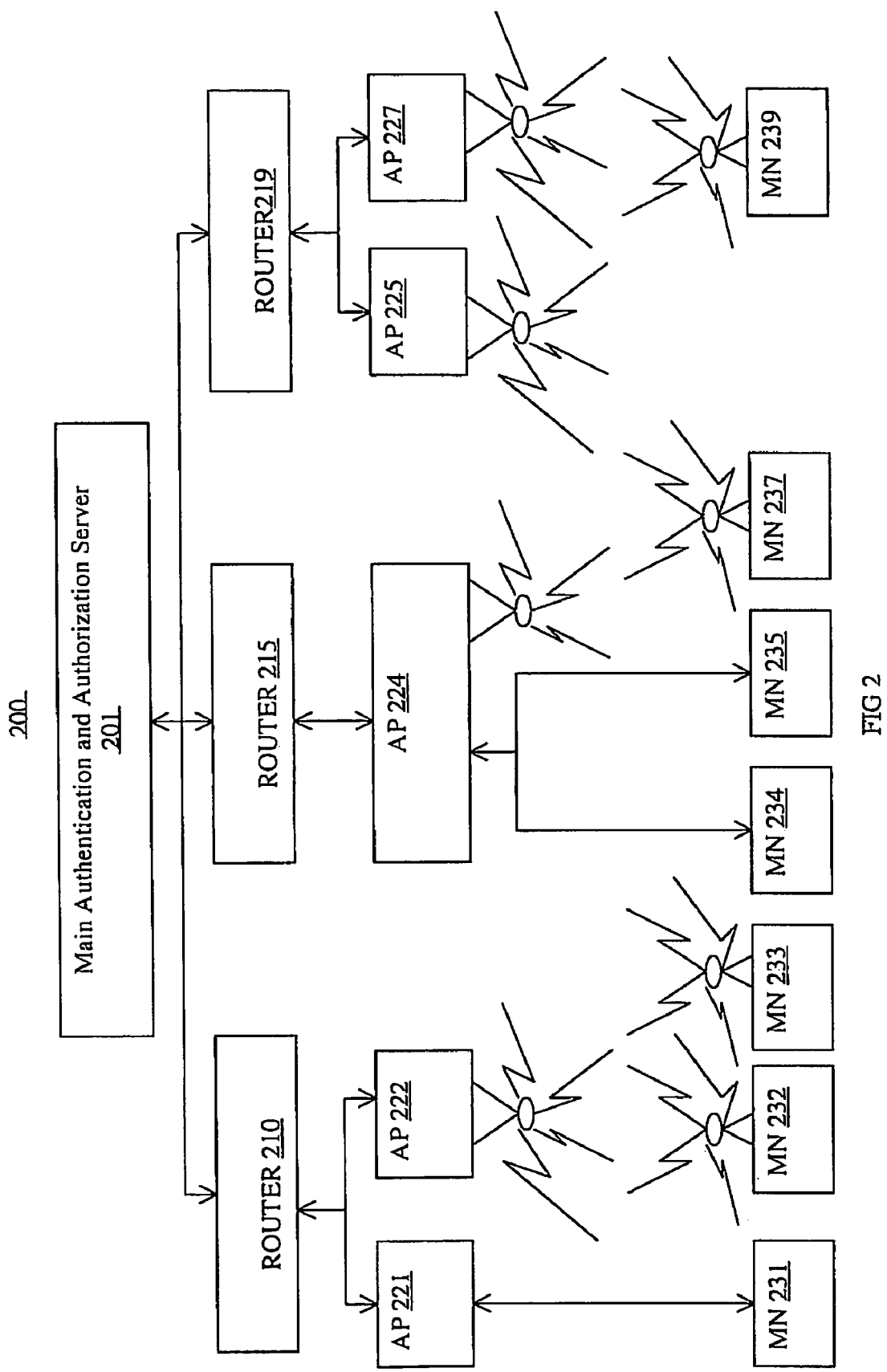
FIG. 2 is a block diagram of an exemplary communications network in accordance with one embodiment of the present invention.

FIG. 2 is a block diagram of communications network 200 in accordance with one embodiment of the present invention. Communications network 200 includes main authentication and authorization server 201, routers 210, 215 and 219, access points 221, 222, 224, 225 and 227, mobile nodes 231, 232, 233, 234, 235, 237 and 239. Main authentication and authorization server 201 is communicatively coupled to routers 210, 215, and 219. Router 221 is communicatively coupled to access points 221 and 222. Router 215 is communicatively coupled to access point 224. Router 219 is communicatively coupled to access points 225 and 227. Access point 221 can be communicatively coupled to mobile node 231 and access point 222 can be communicatively coupled to mobile nodes 232 and 233. Access point 224 can be communicatively coupled to mobile nodes 234, 235 and 237. Access points 225 and 227 can be communicatively coupled respectively to mobile node 239 as mobile node 239 moves into and out of geographical regions associated with wireless access points.

The components of communications network 200 cooperatively operate to provide information communication. Main authentication and authorization server 201 stores client authentication and authorization information (e.g., client identification information, client username, password, encryption related information, etc.). Routers 210 through 219 selectively route communications within the network in accordance with designated parameter limitations. Access points 221 through 227 transmit and receive information to and from clients on mobile nodes in accordance with designated parameter limitations. Mobile nodes 231 through 239 enable authorized clients (e.g., end users) to interact with communications network 200 in accordance with designated parameter limitations and communicate information to other components included in communications network200. When a client utilizes a mobile node (e.g., mobile nodes 231 through 239) to initiate an access to communications network 200, controllers in the access points, routers and server ensure the communications comply with designated parameter limitations. For example, the access points, routers and server can adjust communication permissions and/or power level during designated time intervals.

It is appreciated that a present invention that aspects of the present invention can be implemented in a variety of ways. For example, the present invention can be implemented in software, firmware, hardware and/or combinations thereof. In one exemplary implementation, components of the present invention are implemented as computer readable code stored on a computer readable medium, wherein the software code includes instructions for directing a processor to perform rapid roaming authentication process.

The features of a present invention can be utilized to support a variety of network activities. For example, a present invention features can be utilized to support network activities like internet browsing, e-mail, wireless voice over internet protocol (VoIP), communications, enterprise resource planning (ERP), etc.

FIG. 3 is flow chart of communication method 300 in accordance with one embodiment of the present: invention.

In step 310, a communication device is initialized. In one embodiment, a communication device is powered up. For example, an access point device (e.g., wireless router, etc.) is turned on.

In step 320, communication selectivity parameters are examined. In one embodiment of the present invention, communication selectivity parameters are designated parameters. The selectivity parameters can be a variety of attributes, including time, access attempts or unsuccessful communication initialization attempts, user identification, destination indications and/or source indications (e.g., destination indications and/or source indications included in a communication packet header). The selectivity parameters can also be flexibly applied to certain communication ports. For example, a selectivity parameter that prevents communications during certain time periods (e.g., after normal business hours) can be applied particular communication ports (e.g., wireless ports, individually identified ports, ports communicating with particular devices, etc.) and permit communications on other particular communication ports. (e.g., wired ports, etc.) Selectivity parameters based on time can be based upon a re-occurring time interval. The reoccurring time interval can be a variety of different intervals, including a time interval within a day (e.g., 8:00 pm to 7:00 am, etc.); a day of the week (e.g., every Saturday, Sunday, etc.), or date of the year (e.g., December 25, January 1, July 4, etc). A number of selectively parameter metrics can be combined to In step 330, communication permission is altered based upon the selectivity parameters. In one embodiment, power is altered based upon analysis of the communication selectivity parameters. In one exemplary implementation, power to all or some of the components (e.g., a switch component, port, etc.) of communication device can increased or reduced based upon the analysis of the communication selectivity parameters. For example, altering power includes reducing and/or increasing power to a wireless communication port. In one embodiment, a switching component (e.g., a switch fabric, cross bar switch component, switch matrix component, etc.) prevents communications to and from designated ports in accordance with the selectivity parameters. For example, a switching component prevents communications to and/or from a port based upon a time interval (e.g., a night time interval during a day).

In one embodiment of the present invention, communication permission includes new session access permission to a communication device which is changed based upon the communication selectivity parameters. For example, after a designated time of day, existing communication sessions (e.g., network clients that are login onto a network session) are permitted to continue while users attempting to initiate a new network session are prevented from accessing the network until a later designated time. The new session access permission to a communication device can also be changed based upon communication device component characteristics. For example, devices communicatively coupled to network access point by wiring are permitted to initiate new communication sessions eve after designated times while devices attempting to wireless communicate with an access point are prevented during designated times.

Thus, the present invention is a system and method that facilitates enhanced security protection through auto shut down methods. The present invention also helps minimize power consumption at large since non data forwarding networking equipment can be intelligently powered on an off as configured according to time. The present invention can also reduce radio energy conditions that can be perceived or feared as causing harm as the users in surrounding areas are not unnecessarily exposed to radio energy radiation.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An apparatus comprising:
a network port to exchange one or more communication data packets over a network;
a plurality of access ports to exchange data with one or more remote endpoint devices, wherein the access ports include a wireless access port to exchange wireless data signals with the one or more remote endpoint devices through one or more existing communication session between the apparatus and the one or more endpoint devices;
a switching device to transfer one or more communication data packets received from the network with the network port to the wireless access port for transmission as wireless data signals to at least one of the remote endpoint devices, or to transfer wireless data signals received by the wireless access port to the network port for transmission over the network as one or more communication data packets; and
a controller to allow the one or more endpoint devices access to the network through the switching device of the apparatus according to one or more communication selectivity parameters, wherein the controller is configured to compare the communication selectivity parameters with a current day and time to determine whether to reduce access to the network for at least one of the remote devices, wherein the controller is configured to manage access to the network by the one or more remote endpoint devices on a per access port basis, wherein the controller is configured to allow network access over one or more wired ports and prohibit network access over the wireless port based on the comparison, wherein the controller includes at least one mapping table to correlate access permissions with each of the plurality of access ports, and wherein the controller is configured to prohibit initiation of new communication sessions with the apparatus by the one or more remote devices based, at least in part, on the comparison, while allowing those remote endpoint devices with existing communication sessions with the apparatus to continue to access the network through the switching device of the apparatus and while allowing any remote endpoint device that roams into range of the wireless access port to access the network through the switching device of the apparatus when the remote endpoint device has at least one existing communication session transferred from another access point associated with the apparatus.

2. The access point device of claim 1, wherein the controller is configured to manage access to the network by reducing a transmission range of the wireless access point, wherein the controller is configured to reduce the transmission range of the wireless access point by reducing power supplied to the wireless access port.

3. The apparatus of claim 2, wherein the controller includes a memory to store the one or more communication selectivity parameters, wherein the controller is configured to adjust the power supplied to the wireless access port according to the communication selectivity parameters.

4. The apparatus of claim 1, wherein the controller is configured to direct the switching device to cease responding to port identification signals from remote devices according to the communication selectivity parameters, wherein the port identification signals request the apparatus to notify the remote devices that the apparatus exists.

5. The apparatus of claim 1, wherein the communication selectivity parameters identify network access restrictions based on at least one of a time of an attempted access, a date of the attempted access, a number of previous failed attempts of access by the remote device, or which remote device is attempting to access the network.

6. The apparatus of claim 1, wherein at least one of the network port or the wireless access port is configured to receive a forwarding message from a remote access point, the forwarding message to indicate that the remote access point has an existing communication session with at least one of the remote devices, and when at least one of the remote devices roams into a transmission range of the wireless port and when the controller is prohibiting initiation of new communication sessions with the apparatus based, at least in part, on the comparison, the controller is configured to allow the at least one of the remote devices to access the network through the apparatus according to the forwarding message even though the at least one of the remote devices did not have an existing communication session with the apparatus.

7. a method comprising:
examining, with an access point, a mapping table that correlates one or more predetermine network access parameters to a plurality of access ports on a per access port basis, wherein the examining includes comparing the one or more predetermine network access parameters with a current day and time;
determining any network access restrictions for the remote endpoint devices through a wireless access port of the access point based on the comparison of the one or more predetermine network access parameters with the current day and time;
when the comparison of the predetermine network access parameters indicates that there are no network access restrictions, transferring, with a switching device of the access point, wireless data signals received by the wireless access port from one or more remote endpoint devices to a network through a network port of the access point, wherein the network port is configured to transmit the wireless data signals over the network as one or more communication data packets;
when the comparison of the predetermine network access parameters indicates that there is at least one network access restriction, preventing, with the access point, initiation of new communication sessions with the remote endpoint devices, allowing those remote endpoint devices with existing communication sessions with the access point to continue to access the network through the access point, allowing remote endpoint devices access to the network over one or more wired ports of the access point, and allowing any remote endpoint device that roams into range of the wireless access port to access the network through the access point when the remote endpoint device has at least one existing communication session with another access point.

8. The method of claim 7, further comprising reducing power supplied to the wireless access port to reduce a transmission range of the wireless access point.

9. The method of claim 7, further comprising when the predetermine network access parameters indicate that there is at least one network access restriction, ceasing to respond to port identification signals from one or more remote endpoint devices, wherein the port identification signals request the access point to notify the remote devices that the access point exists.

10. The method of claim 7, further comprising, when the predetermine network access parameters indicate that there is at least one network access restriction, ceasing to transfer wireless data signals received from the network to the wireless access port for transmission to one or more remote endpoint devices.

11. The method of claim 7, wherein the predetermine network access parameters identify network access restrictions based on at least one of a time of an attempted access, a date of the attempted access, a number of previous failed attempts of access by the remote device, or which remote device is attempting to access the network.

12. The method of claim 7, further comprising:
receiving, with the access point, a forwarding message from a remote access point, the forwarding message to indicate that the remote access point has an existing communication session with at least one of the remote devices; and
when the access point is preventing initiation of new communication sessions and at least one of the remote devices roams into a transmission range of the wireless access port, allowing the at least one of the remote devices to access the network through the wireless access port of the access point according to the forwarding message even though the at least one of the remote devices did not have an existing communication session with the access point.

13. a system comprising:
means for examining one or more predetermine network access parameters to determine any network access restrictions for the remote endpoint devices through a wireless access port, wherein the means for examining is configured to examine a mapping table that correlates the predetermine network access parameters to a plurality of access ports including the wireless access port on a per access port basis, and wherein the means for examining is configured to compare the one or more predetermine network access parameters with a current day and time to determine any network access restriction;
means for transferring wireless data signals received by the wireless access port from one or more remote endpoint devices to a network via a network access port when the comparison of the predetermine network access parameters indicates that there are no network access restrictions, wherein the network access port is configured to transmit the wireless data signals over the network as one or more communication data packets; and
means for preventing initiation of new communication sessions with the remote endpoint devices when the comparison of the predetermine network access parameters indicates that there is at least one network access restriction, wherein the means for preventing is configured to allow those remote endpoint devices with existing communication sessions to continue to access the network through the wireless access port, allow remote endpoint devices access to the network with sessions through one or more wired ports, and allow any remote endpoint device that roams into range of the wireless access port to access the network when the remote endpoint device has at least one existing communication session with another access point.

14. The system of claim 13, further comprising means for reducing power supplied to the wireless access port to reduce the transmission range of a wireless access point.

15. The system of claim 13, further comprising means for ceasing to respond to port identification signals from one or more remote endpoint devices to the network when the predetermine network access parameters indicate that there is at least one network access restriction, wherein the port identification signals request a wireless access point to notify the remote devices that the wireless access point exists.

16. The system of claim 13, further comprising means for ceasing to transfer wireless data signals received from the network to the wireless access port for transmission to one or more remote endpoint devices when the predetermine network access parameters indicate that there is at least one network access restriction.

17. The system of claim 13, wherein the predetermine network access parameters identify network access restrictions based on at least one of a time of an attempted access, a date of the attempted access, a number of previous failed attempts of access by the remote device, or which remote device is attempting to access the network.

18. The system of claim 13, further comprising means for receiving a forwarding message from a remote access point, the forwarding message to indicate that the remote access point has an existing communication session with at least one of the remote devices, and when at least one of the remote devices roams into a transmission range of the wireless access port the means for preventing is configured to allow the at least one of the remote devices to access the network through the wireless access port according to the forwarding message even though at least one of the remote devices did not have an existing communication session and the predetermine network access parameters indicate that there is at least one network access restriction.

* * * * *

UNITED STATES PATENT AND TRADEMARK OFFICE
CERTIFICATE OF CORRECTION

| | | |
|---|---|---|
| PATENT NO. | : 7,720,462 B2 | Page 1 of 1 |
| APPLICATION NO. | : 11/187341 | |
| DATED | : May 18, 2010 | |
| INVENTOR(S) | : Chu | |

It is certified that error appears in the above-identified patent and that said Letters Patent is hereby corrected as shown below:

| | |
|---|---|
| Title Pg, Item (54) Title: | After "ENHANCING" insert -- SYSTEM AND METHOD --. |
| Column 1, line 2 | After "ENHANCING" insert -- SYSTEM AND METHOD --. |
| Column 8, line 20 | In Claim 1, delete "session" and insert -- sessions --, therefor. |
| Column 8, line 21 | In Claim 1, after "more" insert -- remote --. |
| Column 8, line 31 | In Claim 1, after "more" insert -- remote --. |
| Column 8, line 48 | In Claim 1, after "remote" insert -- endpoint --. |
| Column 9, line 20 | In Claim 6, after "," delete "and". |

Signed and Sealed this
Thirty-first Day of May, 2011

David J. Kappos
*Director of the United States Patent and Trademark Office*